United States Patent Office 2,803,134
Patented Aug. 20, 1957

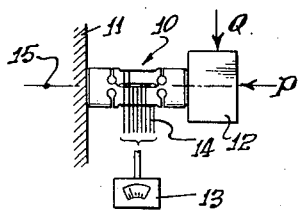
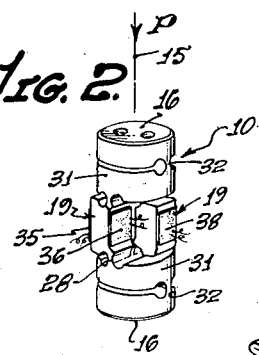
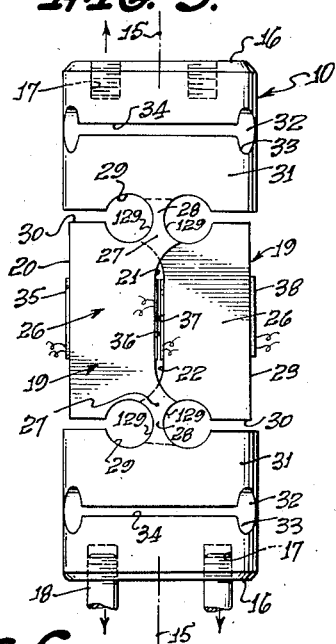
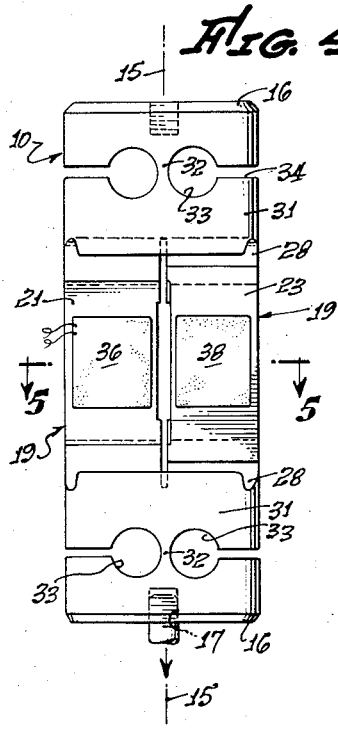
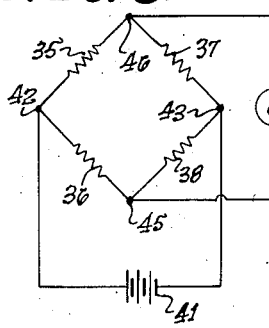
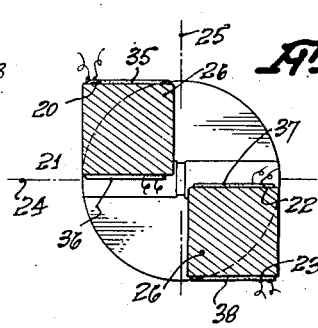
Elmer F. Ward, INVENTOR.

2,803,134

ECCENTRIC LOAD COMPENSATING STRAIN GAUGE MOUNT

Elmer F. Ward, Pasadena, Calif., assignor to Task Corporation, Pasadena, Calif., a corporation of California Application September 26, 1955, Serial No. 536,413

13 Claims. (Cl. 73—141)

This invention relates generally to strain gauge supports adapted to be subjected to various types of loading productive of strain or deformation communicated to strain gauges. More particularly, the invention concerns the provision of a novel multiple strain gauge support characterized in its design and arrangement of strain gauge supporting surfaces by symmetry of location thereof such that during general loading of the support, accurate electrical measurement of forces exerted endwise on the support may be realized without the introduction of error into such measurement caused by strains at the gauge supporting surfaces due to forces other than such endwise forces. The invention is also directed to reducing the overall size and particularly the length of the strain gauge support while maintaining the desired size of the strain gauge supporting surfaces and without sacrificing certain required load transferring characteristics of the support, for purposes as will be brought out in detail.

Referring generally to the use of electric strain gauge supports, such devices find wide application in fields where testing of models or prototypes is being conducted to obtain knowledge as to the magnitudes and directions of forces and moments of force applied to the models or prototypes, as by wind loading, vibration and the like. In carrying out such test programs, a typical strain gauge support is connected between the element of the model or prototype being subjected to the loading to be measured and a reference or base member, so that the loads are transferred from the element through the strain gauge support causing deformation thereof. When an electric strain gauge is connected to a surface of the support being formed, and when the gauge is connected into an appropriate electrical circuit, voltage or current changes in the circuit are observed corresponding to the deformation of the support and indicating the degree of such deformation.

For the purpose of obtaining electrical measurements of tensile or compressive loading exerted along or parallel to a reference axis, a particular type of strain gauge support known as an eccentric beam column has been used, in which a pair of strain gauges are fastened to a pair of support surfaces on the column which are subjected respectively to tension and compressive loading due to the eccentricity of the column relative to the reference axis. The amount of tensile or compressive loading of the support may then be electrically determined from changes in the electrical resistance properties of the strain gauges produced during such loading. However, the exertion on the strain gauge support of forces and moments of force other than the force whose measurement is sought introduces error into the electrical determination of the desired force due to additional deformation of the strain gauge supporting surfaces communicated to the gauges themselves. Insofar as I am aware, no method of eliminating such error in measurement has been found which gives desired accuracy of measurement of the particular tensile or compressive force under consideration.

Having in mind the foregoing objection to conventional strain gauge supports, it is the primary purpose of the present invention to eliminate, insofar as possible, the introduction of error into the ultimate determination of the force under consideration by providing a novel multiple strain gauge support characterized by symmetrically located gauge supporting surfaces formed on eccentric beam columns which are positioned symmetrically with respect to one another relative to a principle axis of the support. In carrying out the design, a pair of eccentric beams columns are positioned on opposite sides of the principle axis of the support, the columns extending generally in the direction of that axis and having their opposite ends connected to appropriate integral support structure to be described.

Suitable electrical strain gauges are then fastened to the support surfaces on the columns extending generally parallel to the principle axis, and the gauges are conveniently electrically connected together to form a bridge-type circuit, such as the four-element Wheatstone bridge circuit. As will be described in detail, forces exerted at angles to the principle axis of the support and force moments exerted about transverse axes extending through the support tend to distort or strain the gauge supporting surfaces and the gauges themselves; however, since the surfaces are symmetrically arranged, such strains communicated to the gauges change their electrical resistance properties in the bridge circuit in such a way that no electrical measurement of the distortion appears or is read in the output of the bridge circuit. More importantly, the distortion or strains produced at the gauge supporting surfaces by axially directed tension or compression loading of the beam columns is communicated to the gauges themselves in such manner that a direct proportional reading of such distortion and consequently the loading is obtainable from the output of the bridge circuit. For these reasons, the present novel strain gauge support constitutes a significant improvement over prior devices used for the same purpose.

Another advantage embodied in the novel strain gauge support consists in the provision of flexure pivots of improved design and arrangement between opposite ends of the beam columns and opposite ends of the support itself. While the use of flexure pivots is generally known, their prior design in the form of thin plate-like members required undesirable lengthening of the overall support structure, severely restricting the use of such supports as respects relatively small-sized models. The present pivots are formed as small concavely curved webs between pairs of transverse drilled openings extending through the support, requiring much less machining time in their formation, since the concave opposite sides of the webs are suitably formed during drilling of the openings. Furthermore, the two normally extending pivots or webs provided at each end of the support may be positioned relatively more closely together to decrease the overall length of the support, their design being such that a sufficient amount of material remains between them to adequately transfer tensile or compressive loading from the plane of one web to the plane of the other web extending at right angles thereto, as will be more fully described.

Other features and objects of the invention, as well as the details of an illustrative embodiment will be more fully understood from the following detailed description of the drawings, in which:

Fig. 1 is a view illustrating, generally, the use of the strain gauge support;

Fig. 2 is a perspective view of the upright support;

Fig. 3 is an enlarged elevation showing the exterior of the support;

Fig. 4 is a view taken at right angles to Fig. 3;

Fig. 5 is a section taken on line 5—5 of Fig. 4;

Fig. 6 is a diagrammatic representation of a bridge circuit; and

Fig. 7 is an enlarged perspective view of a typical electrical strain gauge to be fastened to the support.

Referring first to Fig. 1, a simplified showing of the use of the strain gauge support includes the support 10 itself having one of its ends secured to a reference member 11 and its opposite end joined to a model 12 undergoing loading as indicated by the arrow labeled "P." The direction of the loading is illustrated as being generally toward the strain gauge support 10, and it will be understood that compression loading of this type and oppositely directed tension loading are to be measured, as by the instrument 13 electrically connected to the support by appropriate leads 14. Furthermore, and as will be more fully brought out, the support 10 will generally by subjected in use to forces, including forces producing moments, other than the compressive and tension loads whose measurements are sought, one such force being illustrated by the arrow labeled "Q" directed toward the model 12. Such other loads and force moments will be communicated to the strain gauge support 10, but will not be registered by the instrument 13 for the reasons as will appear.

As shown in Figs. 3 through 5, the support 10 comprises an elongated body having a major axis indicated at 15 extending through opposite ends 16. The latter contain appropriate threaded openings 17 into which threaded connections 18 may be fastened for joining one end of the support to the reference member 11 and the opposite end of the support to the model or object 12 being subjected to loading.

Intermediate the ends 16 and symmetrically offset from axis 15 are a pair of eccentric beam columns 19 extending generally parallel to axis 15 and having flat support surfaces 20 through 23 formed thereon, as better shown in Fig. 5. The surfaces generally extend parallel to axis 15, surfaces 20 and 21 being formed on opposite sides and intermediate the ends of one column and surfaces 22 and 23 being similarly formed on the other column. In addition, the symmetry of the columns and the surfaces is such that surfaces 20 and 23 form one symmetrical pair while surfaces 21 and 22 form another symmetrical pair. For purposes of describing normal axes about which certain moments of force exerted on the support may be resolved, one such axis labeled 24 in Fig. 5 passes transversely through axis 15 between the column and parallel to surfaces 20 through 23, while a second axis 25 extends transversely through axis 15 between the columns and normal to axis 24 and surfaces 20 through 23.

The main body portion 26 of each beam column located between the support surfaces formed thereon preferably has a rectangular cross-section and is positioned eccentrically with respect to a longitudinal plane passing through axes 15 and 24, as shown in Figs. 3 and 5. The columns also have opposite ends 27 which are integrally joined to webs 28 extending transversely through the body of the support within the axial plane defined by axes 15 and 24, each web being joined to the ends 20 of the two columns on opposite sides of axis 15. As brought out in the introduction, webs 28 are formed by drilling transverse spaced openings 29 through the body of the support so that the webs have circularly concave opposite sides 129. To complete the separation of the ends 27 of the columns from the rest of the support, lateral slots 30 are cut through the support body from opposite sides thereof to the drilled openings 29 in the manner shown in Figs. 3 and 4, the slots being considerably narrower than the diameters of the openings to preserve a maximum of material defining connecting portions 31 of the body.

Referring now to Fig. 4 two additional webs 32 are formed in the support normal to webs 28 and in axially spaced relation thereto. Pairs of drilled openings 33 likewise define the circularly concave opposite sides of webs 32, the lateral slots 34 separating body portions 31 from the ends 16 of the support. The pairs of webs 28 and 32 preferably have the same physical dimensions and essentially comprise flexure pivots extending in longitudinally spaced axial planes and adapted to flex much more readily than the beam columns 19 when support 10 is subjected to force other than endwise. Since the relatively normal webs 28 and 32 have concave opposite sides extending toward and forming the opposite ends of body portions 31, they are essentially partially combined therewith so that the overall length of the support 10 is substantially reduced without sacrificing the sectional properties of portions 31 which are required to transfer endwise applied loads through 90° from one web 32 to the other web 28.

As shown in the drawings, four strain gauges 35 through 38 are fastened respectively to support surfaces 20 through 23 of the eccentric beam columns, as by bonding them thereto in a manner well known in the art. A typical electrical strain gauge of this type is shown in Fig. 7 to comprise a continuous fine wire 39 formed as a grid and embedded between two sheets of insulating material 40 from which the two ends of the wire project. When fastened to a surface undergoing mechanical strain, such a strain gauge undergoes equivalent strain in such manner as to proportionally change the electrical resistance properties of the wire.

Referring now to Fig. 6, the four strain gauges 35 through 38 are conveniently connected into the Wheatstone bridge circuit illustrated, in which each of the gauges forms one leg of the circuit. Pairs of symmetrically located gauges are connected as opposite legs of the circuit. For measurement purposes, a source of current comprising battery 41 is connected between terminals 42 and 43 representing the junctions between gauges 35 and 36 and gauges 37 and 38 respectively, while a voltage sensitive instrument 44 is connected between terminals 45 and 46 representing respectively the junctions between the gauges 36 and 38 and gauges 35 and 37.

In operation, a load exerted along or in the direction of axis 15, such as is designated by the arrow "P" in Figs. 1 and 2, is transmitted through the body of the strain gauge support including the eccentric beam columns 19. Assuming that load "P" is compressive, surfaces 20 and 23 of the beam columns will be put under tensile stress whereas surfaces 21 and 22 will be subjected to compression stress, and furthermore the stresses and strains at pairs of surfaces 20 and 23, and surfaces 21 and 22 will be equal, due to their symmetry with respect to axis 15. As a result of such strain, the electrical resistance characteristics of the symmetric strain gauges 35 and 38 will be changed equally to a first value, while the electrical resistance properties of symmetric gauges 36 and 37 will also be changed equally but to another value, so that the bridge will be electrically unbalanced and a reading will be obtained from the instrument 13, the reading being proportional to the "P" loading on the strain gauge support. Similarly, a tension load on the support directed oppositely to the arrow "P" will also be recorded on the instrument 13 and can be read directly therefrom after proper calibration.

Assuming, however, that a load such as that designated by arrow "Q" is exerted on the model 12 so as to produce a moment of force about axis 24 of the strain gauge as shown in Fig. 5, it will be seen that surfaces 20 and 21 will be put, for example, into tension while surfaces 22 and 23 will be thrown into compression. As a result, the electrical resistance properties of gauges 35 and 36 will be changed equally, while the properties of gauges 37 and 38 will also be changed equally but differently from gauges 35 and 37. Referring to Fig. 6, it will be seen that the bridge remains electrically balanced under these conditions, and no reading is obtained from instrument 13. Similarly, a moment of force exerted about axis 25 of the strain gauge support will produce equal changes in the resistance properties in gauges 35 and 36, and equal changes in gauges 37 and 38 but again different from gauges 35 and 36. These changes will not unbalance the bridge circuit, so that no reading of this moment will be obtained from instrument 13. Thus it will be evident that any forces exerted on the model 12 other than forces exerted in the direction of or parallel to axis 15 or force moments about that axis will produce no reading at instrument 13. Finally, while it is possible that there may be some force exerted on the model 12 productive of twist about axis 15 of the strain gauge support, such forces are generally relatively small in relation to compressive and tensile forces exerted along or in the direction of axis 15, and their recordation by the instrument 13 therefore produces negligible error in the determination of the desired forces.

In conclusion it will be observed that the flexure pivots or webs 28 and 32 accommodate flexing of the support about the pivot axes parallel to axes 24 and 25 much more readily than do the sections 26 of the beam columns, so that strains produced at the gauge supporting surfaces are minimized in the first instance. In other words, the strain gauge support adjusts itself to loads exerted in directions other than in axis 15 so that a minimum of distortion or strain is communicated to the gauge supporting surfaces by such loads, whereas endwise loads exerted in the direction of axis 15 are fully transmitted to the beam columns producing strains on the gauge surfaces. In addition, twisting loads exerted about axis 15 are much more readily absorbed by the webs 28 and 32 than by the sections 26 of the eccentric beam columns, so that distortion of the gauge supporting surfaces due to such twisting loads is minimized in the first instance.

I claim:

1. A multiple strain gauge support, comprising a body having opposite ends for receiving endwise application of force in the direction of the body axis, said body including a pair of integral body members extending in the direction of said axis in laterally spaced offset relation thereto and intermediate said ends for transmitting said force, each of said members having two parallel surfaces extending substantially parallel to said axis in symmetrically offset relation thereto for supporting strain gauges, both of said support surfaces on either one of said members being staggered with respect to both of the support surfaces on the other of said members, said body including a pair of integral relatively normal reduced cross section portions extending in longitudinally spaced axial planes between each of said ends and said members and said body containing recesses at opposite sides of said portions and formed laterally inwardly from opposite body sides, said portions being adapted to transmit said force and to flex in response to force applied to said body at an angle to said axis.

2. A multiple strain gauge support, comprising a body having opposite ends for receiving endwise application of force in the direction of the body axis, said body including a pair of integral body members extending in the direction of said axis in laterally spaced offset relation thereto and intermediate said ends for transmitting said force, each of said members having two parallel surfaces extending substantially parallel to said axis in symmetrically offset relation thereto for supporting strain gauges, both of said support surfaces on either one of said members being staggered with respect to both of the support surfaces on the other of said members, said body including a pair of integral relatively normal reduced cross section portions having concave opposite sides and extending in longitudinally spaced axial planes between each of said ends and said members and said body containing recesses at opposite sides of said portions and formed laterally inwardly from opposite body sides, said portions being adapted to transmit said force and to flex in response to force applied to said body at an angle to said axis.

3. A multiple strain gauge support, comprising a body having opposite ends for receiving endwise application of force in the direction of the body axis, said body including a pair of integral body members extending in the direction of said axis in laterally spaced offset relation thereto and intermediate said ends for transmitting said force, each of said members having two parallel surfaces extending substantially parallel to said axis in symmetrically offset relation thereto for supporting strain gauges, both of said support surfaces on either one of said members being staggered with respect to both of the support surfaces on the other of said members, said body including a pair of integral relatively normal webs extending in longitudinally spaced axial planes between each of said ends and said members and said body containing recesses including concave openings at opposite sides of said webs and formed laterally inwardly from opposite body sides, said webs being adapted to transmit said force and to flex in response to force applied to said body at an angle to said axis.

4. A multiple strain gauge support, comprising a body having opposite ends for receiving endwise application of force in the direction of the body axis, said body including a pair of integral beam columns extending in the direction of said axis in laterally spaced offset relation thereto and intermediate said ends for transmitting said force, each of said columns having two parallel surfaces extending substantially parallel to said axis in symmetrically offset relation thereto for supporting strain gauges, both of said support surfaces on either one of said columns being staggered with respect to both of the support surfaces on the other of said columns, said body including a pair of integral relatively normal webs extending in longitudinally spaced axial planes between each of said ends and said columns and said body containing recesses at opposite sides of said webs and formed laterally inwardly from opposite body sides, said webs being adapted to transmit said force and to flex in response to force applied to said body at an angle to said axis.

5. A multiple strain gauge support, comprising an elongated metallic body having opposite ends for receiving endwise application of force in the direction of the body axis, said body including a pair of integral eccentric beam columns extending in the direction of said axis in laterally spaced symmetrically offset relation thereto and intermediate said ends for transmitting said force, each of said columns having a pair of substantially parallel surfaces adapted to support strain gauges and formed on opposite column sides to extend in the direction of said axis and in symmetric relation to similar surfaces formed on the other of said columns, both of said support surfaces on either one of said columns being staggered with respect to both of the support surfaces on the other of said columns, said body including a pair of integral relatively normal webs extending in longitudinally spaced axial planes between each of said ends and said columns and said body containing recesses at opposite sides of said webs and formed laterally inwardly from opposite body sides, said webs being adapted to transmit said force and to flex in response to force applied to said body at an angle to said axis.

6. The invention as defined in claim 5 in which the portions of said columns having said surfaces formed thereon are positioned on opposite sides respectively of a pair of axial planes extending respectively substantially parallel and perpendicular to said surfaces.

7. The invention as defined in claim 6 in which two of said webs extend in said parallel plane and are integrally connected respectively with opposite end portions of said columns.

8. The invention as defined in claim 5 in which said recesses comprise concave openings at opposite sides of said webs.

9. The invention as defined in claim 8 in which said recesses also comprise transverse slots interconnecting said openings with said body sides and having reduced width relative to said openings.

10. The invention as defined in claim 8 in which each of said webs has reduced thickness relative to the thickness of each of said columns between said surfaces formed thereon.

11. The combination, comprising an elongated metallic body having opposite ends for receiving endwise application of force in the direction of the body axis, said body including a pair of integral body members extending in the direction of said axis in laterally spaced offset relation thereto and intermediate said ends for transmitting said force, each of said members having two parallel surfaces extending substantially parallel to said axis in symmetrically offset relation thereto for supporting strain gauges, both of said support surfaces on either one of said members being staggered with respect to both of the support surfaces on the other of said members, said body including a pair of integral relatively normal webs extending in longitudinally spaced axial planes between each of said ends and said members and said body containing recesses at opposite sides of said webs and formed laterally inwardly from opposite body sides, said webs being adapted to transmit said force and to flex in response to application of force to said body at an angle to said axis, and a plurality of electrical strain gauges fastened respectively to said surfaces for deformation therewith in response to transmission of said force by said members, said gauges being connectible into an electrical circuit the output of which changes in accordance with deformation of said surfaces.

12. The invention as defined in claim 11 comprising a pair of surfaces formed on each of said columns and a plurality of strain gauges each fastened to one of said surfaces.

13. The invention as defined in claim 12 in which said gauges are electrically connected together into a Wheatstone bridge circuit, with symmetrically positioned gauges comprising opposite legs of said circuit.

References Cited in the file of this patent

UNITED STATES PATENTS

| | | |
|---|---|---|
| 2,561,318 | Ruge | July 17, 1951 |
| 2,611,266 | Wiancko | Sept. 23, 1952 |